United States Patent
Tse

(10) Patent No.: US 7,985,793 B2
(45) Date of Patent: Jul. 26, 2011

(54) COMPOSITES COMPRISING ELASTOMER, LAYERED FILLER AND TACKIFIER

(75) Inventor: Mun Fu Tse, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/824,266

(22) Filed: Jun. 29, 2007

(65) Prior Publication Data

US 2009/0005493 A1  Jan. 1, 2009

(51) Int. Cl.
*C08K 3/34* (2006.01)
*C09B 67/00* (2006.01)

(52) U.S. Cl. .................. 524/445; 524/502

(58) Field of Classification Search .......... 524/445, 524/502
See application file for complete search history.

(56) References Cited

U.S. PATENT DOCUMENTS

| 2004/0194863 A1 | 10/2004 | Grah | |
| 2005/0027062 A1* | 2/2005 | Waddell et al. | 524/496 |
| 2007/0051376 A1* | 3/2007 | Kulichikhin et al. | 128/894 |
| 2007/0161735 A1* | 7/2007 | Bergman | 524/445 |

FOREIGN PATENT DOCUMENTS

| EP | 1 408 074 | 4/2004 |
| WO | WO 02/48257 | 6/2002 |
| WO | WO 2007/070063 | 6/2002 |

OTHER PUBLICATIONS

"ExxonMobil Chemical, Presentation of The Society of Adhesion and Interface", Korea, Aug. 2001.*
U.S. Appl. No. 11/400,662, filed Apr. 7, 2006, Wang et al.

* cited by examiner

*Primary Examiner* — William K Cheung
(74) *Attorney, Agent, or Firm* — Nancy T. Krawczyk; Andrew B. Griffis

(57) ABSTRACT

The invention relates to rubber nanocomposites particularly suitable for innerliners and other tire applications. The uncured nanocomposite comprises an elastomer, tackifier and nanoclay.

12 Claims, No Drawings

COMPOSITES COMPRISING ELASTOMER, LAYERED FILLER AND TACKIFIER

FIELD OF THE INVENTION

The invention relates to elastomer composites particularly suitable for innerliners and other tire applications.

BACKGROUND OF THE INVENTION

The largest used volume of Butyl polymers based on brominated isobutylene methyl styrene monomer (BIMSM), such as EXXPRO™ elastomer, is in the tire innerliner area. Air impermeability is the most important performance property of Butyl polymers in this application.

The idea of using nanoclay or organoclay to provide a step increase in impermeability of polymer is known. It has recently been discovered that increasing the amount of either brominated paramethyl styrene (BrPMS) or paramethyl styrene (PMS) content in BIMSM will result in the disappearance of the clay signal peak when X-ray experiment is performed on the blends of BIMSMs with several organoclays; (U.S. application Ser. No. 11/400,662, filed Apr. 7, 2006).

A common problem for nanocomposites in general is processability of the materials before cure, resulting in a high Mooney viscosity number measured at 125° C. This problem has conventionally been addressed by adding a processing oil or diluent in the compound to reduce viscosity. However, the cured nanocomposites containing oil or diluent will have a higher gas permeation rate, producing a deleterious effect on the barrier properties of the articles.

The present inventor has surprisingly discovered that the addition of tackifier to nanocomposites provides, in embodiments, compositions with improved performance in at least one of processability and barrier properties.

SUMMARY OF THE INVENTION

The present invention is directed to nanocomposites comprising elastomers and tackifiers.

The invention is also directed to improved performance in at least one of processability and barrier properties in nanocomposite compositions in the presence of tackifiers.

These and other objects, features, and advantages will become apparent as reference is made to the following detailed description, preferred embodiments, examples, and appended claims.

DETAILED DESCRIPTION

According to the invention, tackifiers are added to nanocomposites comprising nanoclay and elastomer. In embodiments, the compositions are cured and used as an air barrier in a structure, such as an innerliner for tires, inner tubes, and the like.

When mixing an elastomer with a nanoclay, the addition of a tackifier, in preferred embodiments, improves both the processability of the nanocomposite before curing and the barrier properties of the final cured nanocomposite.

In one preferred embodiments, exemplified hereinbelow, results are presented using EXXPRO™ nanocomposites containing Cloisite 20A (C20A), carbon black, and curatives prepared by melt mixing. Other methods, such as solvent mixing, emulsion mixing, may be used. This is due to the fact that tackifiers can be dissolved in a large number of organic solvents, including hexane, because they are amorphous. Also, tackifiers can be easily emulsified into latex forms for blending with various polymer emulsions.

In the preferred embodiment, Escorez™ 5000 tackifiers (derived from DCPD, dicyclopentadiene; followed by hydrogenation of the oligomers) with different molecular weights were used. Of course, there are many classes of tackifier structure, such as aliphatic, aliphatic-aromatic, aromatic, DCPD-aromatic, functionalized, etc., from various commercial sources. A functionalized tackifier may also have a secondary function of exfoliating the clay. Therefore, one can choose the suitable tackifier, which is more compatible with a particular rubber and/or clay, in the nanocomposite. For example, an aliphatic-aromatic or a DCPD-aromatic tackifier should be more compatible with styrene-butadiene rubber (SBR) than an aliphatic or a DCPD tackifier.

EXXPRO™ 03-1, and the tackifiers E-5300, and E-5320 are all available from ExxonMobil Chemical Company, where E-stands for Escorez™. Some properties of these materials are shown in the following Table 1.

TABLE 1

| Material | $M_n$, kg/mole | $M_w/M_n$ | ML 1 + 8 (125° C.) | $T_g$, ° C. | Density, g/cm³ |
|---|---|---|---|---|---|
| EXXPRO 03-1 | 220 | 1.73 | 32 | −65 | 0.92 |
| E-5300 | 0.45 | 1.80 | — | 55 | 1.10 |
| E-5320 | 0.48 | 1.78 | — | 66 | 1.10 |

Both the rubber and the tackifiers are amorphous. The rubber has a high molecular weight (MW), a low glass transition temperature ($T_g$), and a low density, whereas the tackifier has a low MW, a high $T_g$, and a high density. In the industry, the oil or diluent used to plasticize rubbers has a low MW, a low "$T_g$" or pour point, and a low density. EXXPRO 03-1 had mol % BrPMS=0.85 and mol % PMS=4.16.

Blends containing no carbon black and curatives were mixed in a Brabender mixer (50-g capacity) maintained at a stable temperature of 140° C. EXXPRO™ 03-1 was loaded into the pre-heated mixer running at a rotor speed of 60 rpm. After 1 minute, C20A was added slowly to allow full incorporation into the blend, and mixing continued for 7 minutes. Then E-5300 or E-5320 were added as specified by the formulation. The mixing was carried out for about 5 minutes. (Total mixing time was about 13 minutes.) The resulting blend was discharged from the mixer and allowed to cool. The Mooney viscosity, ML 1+8 (125° C.), of the blend was measured according to ASTM D 1646, with samples prepared using a Cutter™ 2000M apparatus (Alpha Technologies). For example, results of a typical test are reported as follows:

32-ML1+8(125° C.)

where 32-M is the Mooney viscosity number, L indicates the large rotor, 1 is the preheat time for the specimen in minutes, 8 is the time in minutes after starting the motor at which the reading is taken, and 125° C. is the test temperature.

These uncured nanocomposites (without carbon black and curatives) were molded at 150° C. for 25 min. Isothermal dynamic mechanical tests (frequency scans) of these molded samples were performed in an ARES Analyzer at 125° C. Conditions were: 25-mm diameter sample, parallel-plate sample holder, 1 or 2% strain, 0.01 to 100 rad/s frequency, and 5 points per decade.

The nanocomposite blends containing carbon black and curatives were prepared in a Brabender mixer (50-g capacity) maintained at a stable temperature of 140° C. The recipe used is shown in the following Table 2:

TABLE 2

| Nanocomposite | Parts |
| --- | --- |
| Elastomer/Nanoclay Masterbatch | 107 (100 parts of rubber and 7 parts of C20A) |
| Carbon Black N660 | 60 |
| Stearic Acid | 1 |
| ZnO Kadox 911 | 1 |
| MBTS (2-Mercaptobenzothiazole Disulfide) | 1 |

C20A can be obtained from Southern Clay Products, Inc. (Gonzales, Tex.). Carbon black N660 can be obtained from, e.g., Cabot Corp. (Billerica, Mass.). Stearic acid, a curing agent, can be obtained from, e.g., C. K. Witco Corp. (Taft, La.), Kadox 911, an activator, can be obtained from C. P. Hall (Chicago, Ill.). MBTS can be obtained from R. T. Vanderbilt (Norwalk, Conn.) or Elastochem (Chardon, Ohio). To start the mixing, EXXPRO™ 03-1 was loaded into the pre-heated mixer running at a rotor speed of 60 rpm. After 1 minute, C20A was added slowly to allow full incorporation into the blend, and mixing continued for 7 minutes. Then E-5300 or E-5320 was added as specified by the formulation. The mixing was carried out for about 5 minute. Carbon black was then added and mixed for 7 minutes. (Total mixing time was about 20 minutes.) The resulting blend was discharged from the mixer and allowed to cool.

The mixer was then cooled down to 40° C. At a rotor speed of 40 rpm, the blend was put back into the mixer and mixing continued for 30 seconds. Stearic acid, ZnO, and MBTS were added and mixing continued for another 3.5 minutes. (Total mixing time was about 4 minutes.) The resulting blend containing carbon black and curatives was discharged from the mixer and allowed to cool. The Mooney viscosity, ML 1+4 (100° C.), of the blend containing N660 and curatives was measured according to ASTM D 1646. For example, results of a typical test are reported as follows:

50-ML 1+4 (100° C.)

where 50-M is the Mooney viscosity number, L indicates the large rotor, 1 is the preheat time for the specimen in minutes, 4 is the time in minutes after starting the motor at which the reading is taken, and 100° C. is the test temperature. The MDR rheometer from Alpha Technologies, Inc. was used for determination of nanocomposite cure kinetics at 170° C., 0.5 arc, and 1-hr run time based on ASTM D 2084.

Stress relaxation experiments of the uncured nanocomposites containing N660 and curatives were performed as follows. A suitable amount of a milled sample of the uncured rubber was placed between Mylar sheets into a preheated mold with a size of 152×152×2.0 mm³ (6×6×0.075 in³), noting the direction of mill grain. The mold was loaded in a curing press set at 100° C. Molding was carried out for 5 min (2 min at 7800 lb and 3 min at 30,000 lb). The molded pad was removed and allowed to condition at room temperature for at least 24 hr before testing. Three 12 mm wide and 75 mm long samples were die-cut without removing the Mylar backing, with mill grain perpendicular to the sample length. The Mylar backing was removed and the sample thickness was measured. A benchmark of 25 mm (1 in) was marked on the sample. At room temperature, it was then stretched to 100% in an Instron Tester at a crosshead speed of 127 mm/min (5 in/min) and held. The tensile force was monitored until it went past the point at which the force decayed by 75% after the crosshead was stopped. The time was counted when the crosshead stopped. Three specimens for each uncured nanocomposite were tested. The average relaxation time was denoted as $t_{75}$. Slow stress decay or relaxation (long $t_{75}$) poses problems in tire building because no operator wants to handle a piece of uncured rubber that continues to shrink as time goes on.

Permeability testing proceeded according to the following description. All nanocomposites were compression-molded with slow cooling to provide defect free pads. A compression and curing press was used. Test samples were vulcanized at 170° C. and cure times were set by using the MDR $t_{90}$ time. Typical thickness of a compression-molded pad, prepared with a Carver press, is around 0.38 mm. Disks with 2" diameter were then punched out from molded pads for permeability testing. These disks were conditioned in a vacuum oven at 60° C. overnight prior to the measurement. The oxygen permeation measurements were performed using a Mocon OX-TRAN 2/61 permeability tester at 40° C. under the principle of R. A. Pasternak et al. in Vol. 8 JOURNAL OF POLYMER SCIENCE: PART A-2 467 (1970). There are six cells per instrument where gas transmission through each test sample in a cell is measured individually. Disks thus prepared were mounted on a template and sealed with vacuum grease. A steady flow of oxygen at 10 mL/min was maintained on one side of the disk, while a steady flow of nitrogen at 10 mL/min was maintained on the other side of the disk. Using the oxygen sensor on the nitrogen side, increase in oxygen concentration on the nitrogen side with time could be monitored. The time required for oxygen to permeate through the disk, or for oxygen concentration on the nitrogen side to reach a constant value, was recorded and used to determine the oxygen gas permeability. Data is reported either as an oxygen permeation rate (OPR) in cc*mm/(m²-day) or a permeability coefficient in cc*mm/(m²-day-mm Hg) obtained by dividing OPR with the atmospheric pressure. To elaborate, OPR is the transmission rate normalized for sample thickness and is expressed as volume (cc) of gas per unit area of sample (m²) in a discreet unit of time (24 hours).

Solvent swelling measurements were carried out in toluene as a means of determining the crosslink density of the EXX-PRO™ rubber phase in the cured nanocomposite. Test specimens were cut from the pad used in Mocon measurements. The weight of carbon black, C20A, and ZnO in the sample was subtracted from the dry and swollen weights of the sample to deduce the dry and swollen weights of the rubber fraction only. The average molecular weight between crosslinks, $M_c$, was calculated from the volume fraction of rubber in the swollen network at equilibrium swelling, $V_r$, based on the Flory-Rehner equation (reference: P. J. Flory, Principles of Polymer Chemistry, Cornell University Press, Ithaca and London, 1953, p. 579):

$$M_c^{-1} = -[\ln(1-V_r) + V_r + \chi V_r^2]/[V_1 \rho_2 \{V_r^{1/3} - (V_r/2)\}]$$

where $V_1$ is the molar volume of the swelling solvent, $\rho_2$ is the density of the rubber, and $\chi$ is the rubber-solvent interaction parameter. Values of $\chi$ used to calculate $M_c$ were: $\chi$(IIR-toluene)=0.557, where IIR denotes butyl rubber (reference: L. R. G. Treloar, The Physics of Rubber Elasticity, 3rd Ed., Clarendon Press, Oxford, 1975, p. 141). It was assumed in the calculations that $\chi$(IIR-toluene)=$\chi$(BIMSM-toluene), i.e., we assume the contribution of the 2.50-5.20 mol % PMS in BIMS is negligible. Of course, the smaller is the $M_c$, the higher is the crosslink density in the rubber phase.

Micro-dumbbell specimens (the base is ~1 cm×1 cm and the center, narrow strip is ~0.6 cm×0.2 cm) were cut from the pad used in Mocon measurements and stress-strain measurements under tension were performed in an Instron tester. Measurements using triplicate samples (conditioned under ambient conditions for 24 hr prior to tests) were performed at room temperature and at a separation speed of 2"/min=850 μm/s. The stress was calculated based on the undeformed cross-sectional area of the test specimen. Strain measurements were based on clamp separation. The tensile toughness was measured as the total area under the stress-strain curve.

The following Table 3 shows the effects of C20A and E-5300 or E-5320 on the Mooney viscosity of EXXPRO 03-1:

TABLE 3

| Uncured Nanocomposite Without N660 and Curatives | ML 1 + 8 (125° C.) |
|---|---|
| EXXPRO 03-1 | 32 |
| EXXPRO 03-1/C20A (Control) | 36 |
| EXXPRO 03-1/E-5300/C20A (Invention) | 31 |
| EXXPRO 03-1/E-5320/C20A (Invention) | 32 |
| EXXPRO 03-1/E-5300 | 29 |
| EXXPRO 03-1/E-5320 | 30 |

The blend of EXXPRO 03-1/C20A contained 7 phr C20A. The blend of EXXPRO 03-1/E-53X0/C20A (X=0 or 2) had 8 wt % of the rubber replaced by E-53X0 and the concentration of C20A was kept at 7 phr. As noted from the above table, the addition of 7 phr C20A in the rubber results in a 4-unit increase in the Mooney viscosity number. However, replacing 8 wt % of the rubber with E-5300 or E-5320 will drop the Mooney viscosity number of the uncured EXXPRO nanocomposite (without carbon black and curatives) containing 7 phr C20A to 31 or 32, respectively. Therefore, the presence of a tackifier will improve the processability of EXXPRO nanocomposite before final cure.

The Mooney viscosity numbers and the relaxation times ($t_{75}$) of the uncured EXXPRO nanocomposites (containing both N660 and curatives) are shown in following Table 4:

TABLE 4

| Uncured Nanocomposite With N660 and Curatives | ML 1 + 4 (100° C.) | $t_{75}$, min |
|---|---|---|
| EXXPRO 03-1/C20A (Control) | 80 | 5.05 |
| EXXPRO 03-1/E-5300/C20A (Invention) | 80 | 3.38 |
| EXXPRO 03-1/E-5320/C20A (Invention) | 73 | 7.05 |
| EXXPRO 03-1/E-5300 | 75 | 2.49 |
| EXXPRO 03-1/E-5320 | 78 | 2.64 |

Therefore, the Mooney viscosity of the uncured EXXPRO nanocomposites (containing both N660 and curatives) remained the same or decreased in the presence of a tackifier. The relaxation time ($t_{75}$) is either decreased or increased depending on the type of tackifier used in the nanocomposite.

Some physical properties of the cured EXXPRO nanocomposites (containing both N660 and curatives) are shown in Table 5 below:

TABLE 5

| Cured Nanocomposite With N660 and Curatives | MDR $t_{90}$, min | OPR | $M_c$, kg/mol | $\sigma_{100}$, MPa | $\sigma_{200}$, MPa | $\sigma_{300}$, MPa | $\sigma_b$, MPa | $\epsilon_b$, % | U, MPa |
|---|---|---|---|---|---|---|---|---|---|
| EXXPRO 03-1 | 24.8 | 98 | 8.41 | 2.92 | 5.92 | 8.96 | 12.1 | 420 | 38 |
| EXXPRO 03-1/C20A (Control) | 29.0 | 93 | 14.7 | 2.44 | 4.91 | 7.48 | 9.95 | 410 | 30 |
| EXXPRO 03-1/E-5300/C20A (Invention) | 32.6 | 85 | 20.6 | 2.25 | 4.43 | 6.62 | 9.53 | 450 | 33 |
| EXXPRO 03-1/E-5320/C20A (Invention) | 29.1 | 83 | 18.0 | 2.40 | 4.74 | 7.17 | 10.7 | 470 | 39 |
| EXXPRO 03-1/E-5300 | 34.0 | 95 | 11.1 | 2.24 | 5.30 | 8.33 | 11.0 | 410 | 33 |
| EXXPRO 03-1/E-5320 | 33.3 | 92 | 11.6 | 2.31 | 5.34 | 8.38 | 11.2 | 410 | 33 | where $\sigma_{100}$, $\sigma_{200}$, $\sigma_{300}$, $\sigma_b$, $\epsilon_b$, and U denote the 100% modulus, 200% modulus, 300% modulus, tensile strength, elongation at break, and tensile toughness, respectively. It is clear from the above table that adding a tackifier to the nanocomposite decreases OPR without any significant effects on the other properties.

Examples of other elastomers useful in the present invention are butyl rubber (isobutylene-isoprene rubber or IIR), bromobutyl rubber (brominated isobutylene-isoprene rubber or BIIR), chlorobutyl rubber (chlorinated isobutylene-isoprene rubber or CIIR), and star-branched butyl rubber (SBB).

Examples of other tackifiers useful in the present invention include those described in WO 2004044051. It should be noted, however, that in contrast to the description in the aforementioned PCT publication, tackifiers in the present invention are more useful in the range of about 1 to about 50 parts per hundred (phr) elastomer, preferably from about 1 to about 25 phr, more preferably about 2 to about 20 phr, still more preferably about 3 to about 15 phr, yet still more preferably about 4 to about 12 phr elastomer. Also, tackifiers with higher values of $T_g$ can be used. Preferred tackifiers for use in this invention include, but are not limited to, oligomers having units selected from the group of cyclopentadiene, substituted cyclopentadiene, $C_4$-$C_6$ conjugated diolefins, and/or $C_8$-$C_{10}$ aromatic olefins.

Nanocomposites may include at least one elastomer and at least one tackifier, as described above and at least one modified layered filler, preferably a nanoclay. The modified layered filler may be produced by the process comprising contacting at least one layered filler such as at least one layered clay with at least one modifying agent.

The modified layered filler may be produced by methods and using equipment well within the skill in the art. For example, see U.S. Pat. Nos. 4,569,923, 5,663,111, 6,036,765, and 6,787,592. Illustrations of such methods are demonstrated in the Example section. However, by no means is this meant to be an exhaustive listing.

In an embodiment, the layered filler such as a layered clay may comprise at least one silicate.

In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are smectite-clays prepared synthetically, e.g., by hydrothermal processes as disclosed in U.S. Pat. Nos. 3,252,757, 3,586,468, 3,666,407, 3,671,190, 3,844,978, 3,844,979, 3,852,405, and 3,855,147.

In yet other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered filler such as the layered clays described above may be modified such as intercalated or exfoliated by treatment with at least one modifying agent or swelling agent or exfoliating agent or additive capable of undergoing ion exchange reactions with the cations present at the interlayer surfaces of the layered filler.

Modifying agents are also known as swelling or exfoliating agents. Generally, they are additives capable of undergoing ion exchange reactions with the cations present at the interlayer surfaces of the layered filler. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of exfoliating additives include those which can be covalently bonded to the interlayer surfaces. These include polysilanes of the structure —$Si(R^5)_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In an embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In yet other embodiments, modifying agents include at least one polymer chain comprising a carbon chain length of from $C_{25}$ to $C_{500}$, wherein the polymer chain also comprises an ammonium-functionalized group described by the following group pendant to the polymer chain E:

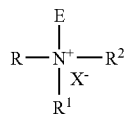

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as $Br^-$, $Cl^-$ or $PF_6^-$.

The modifying agent such as described herein is present in the composition in an amount to achieve optimal air retention as measured by the permeability testing described herein. For example, but not limited to, the additive may be employed from 0.1 to 40 phr in one embodiment, and from 0.2 to 20 phr in another embodiment, and from 0.3 to 10 phr in yet another embodiment.

The exfoliating additive may be added to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

Examples of some commercial products are Cloisites produced by Southern Clay Products, Inc. in Gunsalas, Tex. For example, Cloisite Na+, Cloisite 30B, Cloisite 10A, Cloisite 25A, Cloisite 93A, Cloisite 20A, Cloisite 15A, and Cloisite 6A. They are also available as SOMASIF and LUCENTITE clays produced by CO-OP Chemical Co., LTD. In Tokyo, Japan. For example, SOMASIF™ MAE, SOMASIF™ MEE, SOMASIF™ MPE, SOMASIF™ MTE, SOMASIF™ ME-100, LUCENTITE™ SPN, and LUCENTITE(SWN).

The amount of clay or exfoliated clay incorporated in the nanocomposites in accordance with an embodiment of the invention is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the clay or exfoliated clay may be present from 1 to 30 phr in one embodiment, and from 5 to 20 phr in another embodiment.

The compositions according to the invention, in addition to comprising the rubber and at least one filler, may optionally comprise:

a) at least one processing oil selected from naphthenic, paraffinic, aromatic, MES, TDAE, and mixtures thereof. The process oils MES and TDAE are per se known in the art as, for instance, mineral oil softeners. Such mineral oil softeners are, e.g., MES (mild extraction solvate), produced by solvent extraction of heavy oil distillates or by treating heavy oil distillates with hydrogen in the presence of catalysts (hydration) and which are preferably used in the rubber composition according to the invention due to its presently higher availability, or TDAE (treated distillate aromatic extract). With regard to these mineral oil softeners, V. Null, "Safe Process Oils for Tires with Low Environmental Impact", Kautschuk Gummi Kunststoffe, December 1999, S. 799-805, EP 0 940 462 A2, and U.S. Pat. No. 6,822,043.

b) at least one processing aid and/or plasticizer, for example, plastomer, polybutene, polyalphaolefins (PAO's; examples are oligomers of decene and co-oligomers of decene and dodecene, etc.), high purity hydrocarbon fluid compositions (HPFC's), Group III basestocks, isoparaffins, or mixtures thereof, such as set forth in WO 2004/014998 (Pages 16-24) and WO 2007-067187;

c) at least one cure package or curative or wherein the composition has undergone at least one process to produce a cured composition, such as set forth in WO 2007-067187;

d) any combination of a-c.

In certain embodiments, the elastomeric compositions and the articles made from those compositions may comprise or be manufactured with the aid of at least one cure package, at least one curative, at least one crosslinking agent, and/or undergo a process to cure the elastomeric composition. As used herein, at least one curative package refers to any material or method capable of imparting cured properties to a rubber as commonly understood in the industry. At least one curative package may include any and at least one of the following.

One or more crosslinking agents are preferably used in the elastomeric compositions of the present invention, especially when silica is the primary filler, or is present in combination with another filler. Crosslinking and curing agents include sulfur, zinc oxide, and fatty acids. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

Peroxide cure systems or resin cure systems may also be used.

Heat or radiation-induced crosslinking of polymers may be used.

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, p 18-23 (1991)).

Sulfur is the most common chemical vulcanizing agent for diene-containing elastomers. It exists as a rhombic 8-member ring or in amorphous polymeric forms. The sulfur vulcanization system also consists of the accelerator to activate the sulfur, an activator, and a retarder to help control the rate of vulcanization. Accelerators serve to control the onset of and rate of vulcanization, and the number and type of sulfur crosslinks that are formed. These factors play a significant role in determining the performance properties of the vulcanizate.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Retarders may be used to delay the initial onset of cure in order to allow sufficient time to process the unvulcanized rubber.

Halogen-containing elastomers such as halogenated star-branched butyl rubber, brominated butyl rubber, chlorinated butyl rubber, star-branched brominated butyl(polyisobutylene/isoprene copolymer) rubber, halogenated poly(isobutylene-co-p-methylstyrene), polychloroprene, and chlorosulfonated polyethylene may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction.

Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD, p 25-30 (1993)). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. All such obvious variations are within the full intended scope of the appended claims.

What is claimed is:

1. An uncured air barrier composition comprising an elastomer, layered filler, carbon black, and a resin in the amount of 1 to 50 phr wherein said resin has a molecular weight in the range of 500 to 6,000, a high glass transition temperature Tg relative to the elastomer, and is selected from hydrocarbon resins (hydrogenated or unhydrogenated) having units selected from the group consisting of cyclopentadiene and substituted cyclopentadiene.

2. The uncured composition according to claim 1, wherein said elastomer is selected from BIMSM, butyl rubber, bromobutyl rubber, chlorobutyl rubber, star-branched butyl rubber, and mixtures thereof.

3. The uncured composition according to claim 1, wherein said elastomer is selected from at least one BIMSM.

4. The uncured composition according to claim 1, wherein said resin is present in the amount of from about 1 to about 25 phr.

5. The uncured composition according to claim 1, wherein said layered filler is selected from clays modified by intercalation or exfoliation by treatment with at least one modifying agent or swelling agent or exfoliating agent or additive capable of undergoing ion exchange reactions with the cations present at the interlayer surfaces of the clay.

6. A cured composition according to claim 1.

7. A tire inner liner or inner tube comprising the cured composition according to claim 6.

8. The uncured composition of claim 1, wherein the layered filler comprises at least one silicate selected from montmorillonite, nontronite, beidellite, bentonite, volkonskoite, laponite, hectorite, saponite, sauconite, magadite, kenyaite, stevensite, vermiculite, halloysite, aluminate oxides, hydrotalcite, and mixtures thereof.

9. The uncured composition of claim 5, wherein the modifying agent is an amine with the structure $R^2R^3R^4N$, wherein $R^2$, $R^3$, and $R^4$ are $C_1$ to $C_{30}$ alkyls or alkenes.

10. The uncured composition of claim 9, wherein $R^2$ is a $C_{14}$ to $C_{20}$ alkyl or alkene.

11. The uncured composition of claim 5, wherein the modifying agent includes at least one polymer chain comprising a carbon chain length of from $C_{25}$ to $C_{500}$, wherein the polymer chain also comprises an ammonium-functionalized group described by the following group pendant to the polymer chain E:

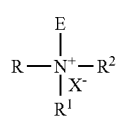

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as $Br^-$, $Cl^-$ or $PF_6^-$.

12. The cured composition of claim 6, wherein the composition has an oxygen permeation rate of 85 or 83 cc*mm/($m^2$-day).

* * * * *